United States Patent
Giaretta et al.

[11] Patent Number: 6,157,757
[45] Date of Patent: Dec. 5, 2000

[54] POLYMER FIBER OPTICAL TRANSMISSION SYSTEM

[75] Inventors: Giorgio Giaretta, Westfield; Whitney White, Chatham, both of N.J.

[73] Assignee: Lucent Technologies Inc., Murray Hill, N.J.

[21] Appl. No.: 09/190,504

[22] Filed: Nov. 12, 1998

[51] Int. Cl.[7] ...................................................... G02B 6/32
[52] U.S. Cl. .............................. 385/35; 385/33; 385/31; 385/143; 385/145
[58] Field of Search ............................... 385/35, 33, 127, 385/12, 123, 124, 131, 144, 145, 141, 142, 143; 356/350; 359/124; 428/375

[56] References Cited

U.S. PATENT DOCUMENTS

| | | | |
|---|---|---|---|
| 4,693,553 | 9/1987 | Sasaki et al. | 385/142 |
| 4,762,392 | 8/1988 | Yamamoto et al. | 385/142 X |
| 4,941,730 | 7/1990 | Takase et al. | 385/142 X |
| 5,416,862 | 5/1995 | Haas et al. | 385/28 |

OTHER PUBLICATIONS

Applications of Perfluorinated Polymer Fibers to Optical Transmission, published on Sep. 22, 1997 in Proceedings of Seventh International Plastics Optical Fiber Conference, pp. 29–30.

*Primary Examiner*—Phan T.H. Palmer
*Attorney, Agent, or Firm*—John A. Caccuro

[57] ABSTRACT

We have determined that unlike the most multimode silica fiber, multimode polymer fiber often exhibits a delay characteristic that has a broad low dispersion region where propagation delay of spatially restricted optical pulses remains relatively constant. This low dispersion region is centered around the center axis of the fiber core as a function of launch position. By directing a transmitted optical pulse to this region, we have determined that optical pulse dispersion can be significantly reduced without the need for using the prior art technique of using a single mode fiber spliced in series with the multimode fiber to reduce dispersion. A polymer fiber based optical transmission system using this arrangement exhibits relaxed alignment tolerances between the optical source and polymer fiber, while reducing dispersion and increasing bandwidth-length product.

12 Claims, 2 Drawing Sheets

POLYMER FIBER OPTICAL TRANSMISSION SYSTEM

TECHNICAL FIELD OF THE INVENTION

This invention relates to a method and apparatus for increasing the capacity of lightwave transmission systems and, more particularly, to a method and apparatus for reducing the complexity and costs of polymer optical fiber based lightwave systems.

BACKGROUND OF THE INVENTION

There has been continued development of communication links to interconnect a computer to other computers, peripheral equipment, local area networks, the internet etc. These communication links typically use copper cable, optical fiber, or wireless as the transmission medium. Because of bandwidth, cost, and interference concerns, optical fiber has become one of the preferred mediums of choice. Because of lower connection costs and robustness, multi-mode glass fiber had become more desirable than single mode glass fiber. Illustrative of such multi-mode optical communication links is the lightwave transmission system described in U.S. Pat. No. 5,416,862, issued to Haas et al, on May 16, 1995, and entitled "LIGHTWAVE TRANSMISSION SYSTEM USING SELECTED OPTICAL MODES." Shown in FIG. 1 is an illustrative multi-mode optical fiber system similar to that disclosed in the patent. To increase the capacity of the multi-mode optical fiber system, a single-mode fiber 104 is connected through a coupler 105 to the multi-mode fiber 107. The coupler 105 is used to selectively propagate only higher-order modes over the multi-mode fiber 107. Other arrangements splice the single-mode fiber 104 to the multi-mode fiber 107 to facilitate the launching of only the lower-order modes over the multi-mode fiber 107.

In an effort to further decrease costs, polymer (plastic) optical fiber (hereinafter also referred to as POF) has been developed for use in optical transmission systems. Because of its large diameter polymer fiber also promotes multi-mode transmission. However, because of its relatively high transmission loss characteristics and its less-desirable transmission wavelength, about 650 nm, polymer fiber has typically only been used in short distance applications. Recently, POF have also been proposed for use in optical transmission systems. An illustrative system is described in the article by H. Imai entitled "APPLICATIONS OF PERFLUORINATED POLYMER FIBERS TO OPTICAL TRANSMISSION," published on Sep. 22,1997 in Proceedings of Seventh International Plastics Optical Fiber Conference, pp. 29–30. FIG. 1 is a simplified representation of the PF fiber based optical system described in the Imai article. Again a single-mode fiber 104 is connected in front of the POF 107 and is used to selectively propagate only lower-order mode transmission over the multi-mode POF.

While the above article illustrates that significant improvements have been made in the use of POF in optical transmission systems, there is a continuing need to simplify such systems and to make them more cost effective.

SUMMARY OF THE INVENTION

In accordance with the present invention, we have determined that unlike other silica fiber, some polymer fiber, POF, exhibits a delay characteristic that has a broad low dispersion region or "sweet-spot" where propagation delay of a spatially restricted optical pulse remains relatively constant as a function of injection position.

This sweet-spot is centered around the center axis of the fiber core. By directing a transmitted optical pulse to this region, we have determined that optical pulse dispersion can be significantly reduced without the need for using the prior art technique of using a single mode fiber spliced in series with the POF to reduce dispersion. A polymer fiber based optical transmission system using this arrangement exhibits relaxed alignment tolerances between the optical source and polymer fiber, while reducing dispersion and increasing bandwidth-length product.

More particularly, our inventive optical transmission apparatus comprises an optical signal restriction device for coupling a received optical signal to a predefined central region of a core region of a polymer fiber which has an approximately flat delay characteristic throughout that central region.

According to our method, an optical signal is transmitted over an polymer fiber by focussing the optical signal to a spot of predefined diameter and coupling the optical signal spot to a predetermined central region of a core region of the polymer fiber which exhibits an approximately flat delay characteristic throughout the central region.

DETAILED DESCRIPTION

In the following description, each item or block of each figure has a reference designation associated therewith, the first number of which refers to the figure in which that item is first described (e.g., 101 is first described in FIG. 1).

Figure 1:
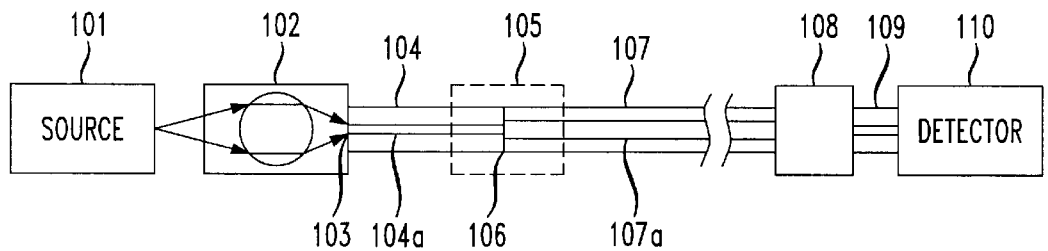
FIG. 1 shows an illustrative block diagram of a prior art multi-mode fiber based optical transmission system.

FIG. 1 shows an illustrative block diagram of a prior art optical transmission system that utilizes a polymer fiber 107. The polymer fiber with a graded-index has been shown to exhibit low wavelength loss at the desirable laser wavelength of 1.3 $\mu$m. Illustratively, the polymer fiber 107 may be of the same type as used in our FIG. 2 system, namely, graded-index perfluorinated plastic optical fiber.

As shown in FIG. 1, a modulated optical source 101, such as a Fabry-Perot laser diode, is coupled through a launch restriction device 102 to a single-mode glass (SM) optical fiber 104. Illustratively for our discussion, we assume that the optical source 101 is a 1.3 $\mu$m Fabry-Perot laser diode and that the launch restriction device 102 is a ball lens. The SM fiber 104 is coupled or spliced 105 to the polymer fiber 107. The single-mode fiber 104 facilitates selective launching of lower-order modes to the polymer fiber 107. The output of the polymer fiber 107 is coupled via a lens 108 to another SM fiber section 109. The single-mode fiber 109 filters out any undesirable higher-order modes from the desired lower-order modes. A detector 108 receives and demodulates the lower-order mode based optical signal received over from SM fiber 109. The lens 108 may be a hemispherical-ended lens and the detector 108 may be an avalanche photodiode (APD).

In operation, the laser signal from source 101 is focussed by ball lens 102 to a predefined diameter spot 103 which is less than or about the same size as the core diameter 104a of the SM fiber 104. Since the SM fiber 104 and the polymer fiber 107 have the same outside diameter, it is relatively easy to splice them together so that the core 104a of SM fiber 104 aligns with the center of core 107a of polymer fiber 107. Typically, the diameter of core 104a of the SM fiber 104 is about 50 μm and the core 107a of the polymer fiber 107 is about 120 μm to 1 mm. Disadvantageously, there may be a significant splicing or coupling loss, of about 1 dB, between the SM fiber 104 and the polymer fiber 107.

Multi-mode fibers, such as polymer fiber 107, suffer from a phenomenon known as "modal dispersion." This modal dispersion is caused when the input optical signal pulse from the source excites multiple modes of the polymer fiber 107. These multiple modes travel at different velocities in polymer fiber 107 and cause the pulse to disperse or spread as it propagates down the fiber. This spreading of the pulse imposes a limit as to how close adjacent pulses can be sent over the polymer fiber and, hence, reduces the maximum data rate that can be sent over the polymer fiber. Since pulse dispersion increases with distance a "bandwidth-distance" product is used to determine if a particular transmission system is suitable for a particular application.

Since a SM fiber 104 confines the optical signal to a small area, it may be used to facilitate the launch of lower-order modes into the polymer fiber 107. The term "lower-order" modes means that most of the optical energy is localized in the central region of the fiber core. The term "higher-order" modes means that most of the optical energy is outside the central region of the fiber core.

Figure 3:
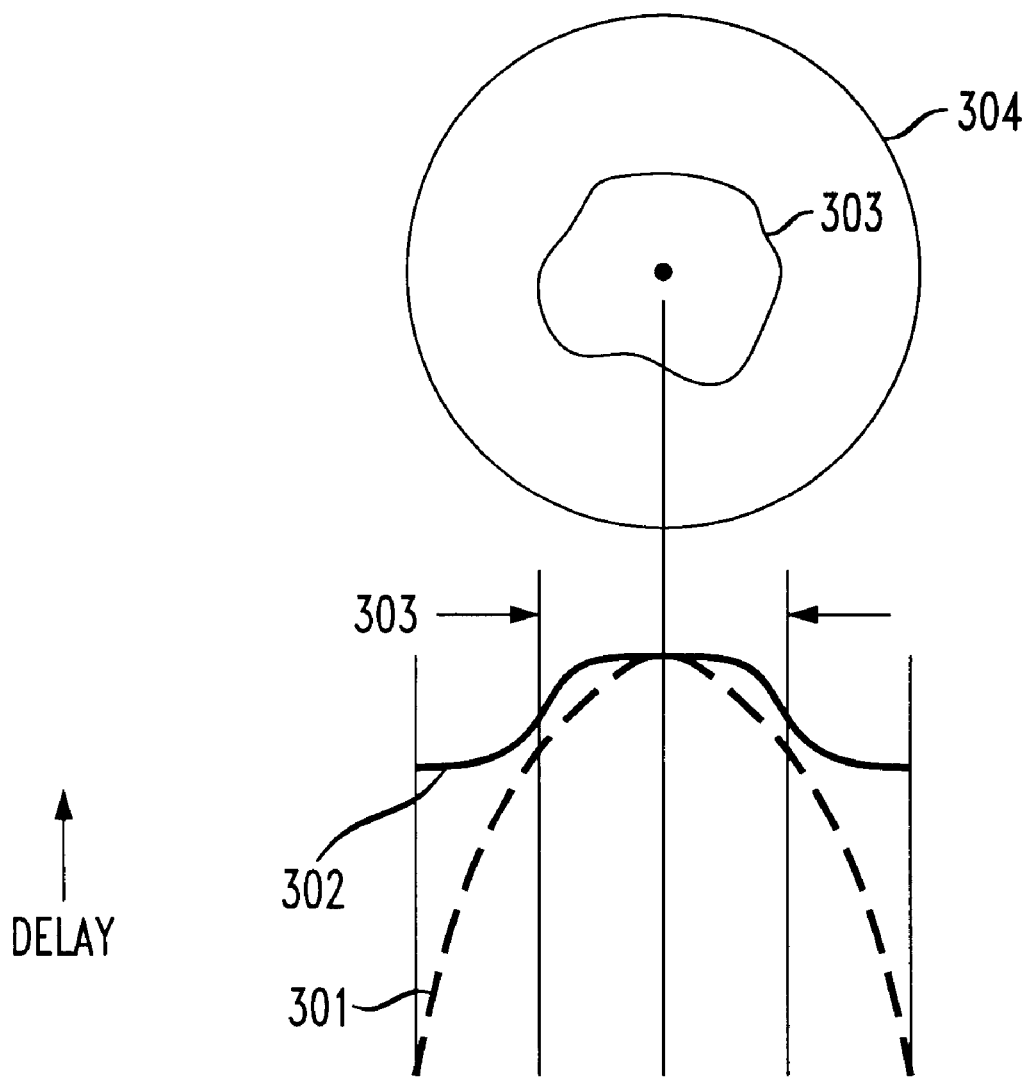
FIG. 3 shows an illustrative diagram of the delay characteristics in the core region of the polymer fiber.

With reference to top of FIG. 3, there is shown a cross-section of a core region 304 of a typical polymer fiber. The lower part of FIG. 3 shows the typical variation of the delay characteristic 301, across the core region 304, that is exhibited by polymer fibers. It should be noted that all graded index fibers have a nominally parabolic index profile, but their delay characteristics are not typically parabolic. Delay characteristics depend on non-idealities of the profile and on mode coupling. As shown, the delay changes as one moves radially outward from the center of core 304. Because the delay greatly varies across the core region 304 significant pulse dispersion will result between the lower-order modes that travel in the central region 303 and the higher-order modes that travel outside the central region 303. In the FIG. 1 prior art arrangement, elimination of the higher-order modes by single mode fibers 104 and 109 reduced the dispersion spread in the propagating pulse (since only the lower-order modes remains). Thus, reducing the range of modes that are being propagated reduces the dispersion in the propagating pulse. This reduced dispersion increases the data transmission rate of the system.

In accordance with the present invention, we have discovered that unlike silica fiber, the polymer fiber, when operated at an optical wavelength of 1.3 μ, exhibits a delay characteristic 302 that has a broad and relatively flat region or "sweet-spot" 303. This sweet-spot (also referred to as a low-dispersion region) 303 is a region centered around the longitudinal axis of the fiber core 304. We have noted that the "diameter" of the low-dispersion region 303 is, typically, a significant part of the diameter (e.g., about half) of the core 304. We have determined that by directing the transmitted optical pulse to this region 303, the resulting dispersion of the lower-order modes will be significantly reduced over that of the polymer fiber characteristic 301. As a result, the broadening of the received optical pulse is minimized. Thus, using this approach, we eliminate the need for the single-mode fiber sections 104 of FIG. 1 to filter out the higher-order modes. While we have used a 1.3 μm wavelength laser signal for our measurements of FIG. 3, other wavelengths within the 0.5 to 1.3 μm operating range of polymer fiber could also be utilized, as long as they are coupled to the sweet-spot of the polymer fiber.

Figure 2:
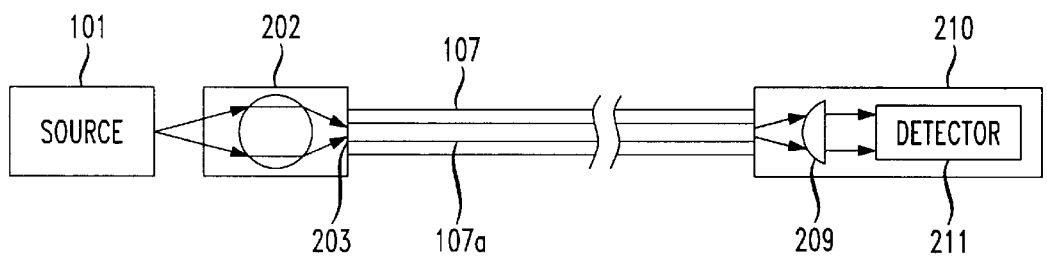
FIG. 2 shows, in accordance with the present invention, an illustrative block diagram of our improved polymer fiber based optical transmission system.

With reference to FIG. 2 there is shown, in accordance with the present invention, an illustrative block diagram of our improved POF fiber based optical transmission system. As shown, the system includes all of the elements from FIG. 1 except that no SM fiber segment 104 is utilized. The optical signal source 101 is coupled via lens 202 to the sweet-spot 203 of core 107a of polymer fiber 107. Since the sweet-spot for a polymer fiber, with a core diameter of 250 μm, is on the order of 120 μm, it is significantly greater that the 50 μm core diameter of the SM fiber 104. Thus, the lens 202 can have a reduced alignment and focussing requirement with the PF fiber 107. Since the sweet-spot of 120 μm is over half the core diameter, transmission capacity can remain high even if the optical signal (about 50 μm ) is somewhat off center. Thus, other types of focussing devices 202 may be used, such as multiple lens systems. At the receiver 210, illustratively, an avalanche photodiode detector (APD) with a built in lens may be used as the lens 209 and detector 211 of FIG. 2. Obviously other types of optical detectors can also be used in receiver 210. Moreover, since APDs have diameters on the order of the diameter of the sweet-spot, it may be possible to eliminate the lens 209 and directly abut the APD to the sweet-spot i.e., at the center of core 304.

Using the optical transmission system arrangement of FIG. 2 we have significantly increased the bandwidth-length product over prior art systems that use plastic fiber in the arrangement of FIG. 1. Additionally, because our PF fiber based transmission system does not require any sections of SM fiber 104 the arrangement is reduced in complexity and cost in comparison to the prior art POF based transmission systems. Moreover, a polymer fiber based optical transmission system using our arrangement exhibits relaxed alignment tolerances between the optical source and the polymer fiber, while also reducing dispersion and increasing bandwidth-length product. While we have noted that a sweet-spot also exists in multi-mode glass fibers, it is much smaller in size thereby reducing the possibility of practical use of our technique in multi-mode glass fiber based systems.

What has been described is merely illustrative of the application of the principles of the present invention. Thus, it should be understood that optical source 101 could also be a Light emitting diode (LED) rather than a Faby-Perot laser diode. Additionally, the launch restriction device 102 can be other than a ball lens. Moreover, the ball lens 102 may be mounted or packaged as part of the laser diode 101. Hence, other arrangements can be implemented by those skilled in the art without departing from the spirit and scope of the present invention.

What is claimed is:

1. An optical transmission apparatus comprising
   a length of polymer fiber and
   an optical signal restriction device for coupling a received optical signal to a predefined central region of a core of the polymer fiber which is less than the diameter of the core and which has an approximately flat delay characteristic throughout the central region.

2. The apparatus of claim 1 wherein the polymer fiber is a perfluorinated polymer fiber.

3. The apparatus of claim 1 wherein the optical signal restriction device is a ball lens.

4. The apparatus of claim 1 wherein the optical signal restriction device is aligned with the longitudinal axis of the polymer fiber.

5. The apparatus of claim 1 further including an optical signal source for generating the received optical signal and wherein the optical signal restriction device is mounted to the optical signal source.

6. The apparatus of claim 1 wherein the diameter of the predefined central region is a significant fraction of the diameter of the core.

7. The apparatus of claim 1 further comprising a receiver for selectively detecting optical signals received in the predefined central region of the core.

8. The apparatus of claim 6 wherein the receiver includes an avalanche photodiode which abuts the central region of the core.

9. The apparatus of claim 1 further comprising an optical laser or LED source for originating the optical signal.

10. A method of transmitting an optical signal over a polymer optical fiber comprising the steps of:

focusing an optical signal to a predefined diameter spot and coupling the predefined diameter optical signal spot to a predetermined central region of a core region of the polymer optical fiber which exhibits an approximately flat delay characteristic throughout that central region.

11. The method of claim 10 further comprising the step of at a receiver location, selectively detecting optical signals received in the predefined central region of the core.

12. The apparatus of claim 10 wherein the polymer fiber is a perfluorinated polymer fiber.

* * * * *